July 18, 1933.  A. G. HILLMAN  1,919,021
CAMERA
Filed May 29, 1931  4 Sheets-Sheet 2

Inventor
Albert George Hillman
By
Nathan, Bowman & Helfrich  Attorney

July 18, 1933. A. G. HILLMAN 1,919,021
CAMERA
Filed May 29, 1931 4 Sheets-Sheet 3

Inventor
Albert George Hillman
By
Nathan Bowman & Helfrich Attorney

July 18, 1933.  A. G. HILLMAN  1,919,021
CAMERA
Filed May 29, 1931  4 Sheets-Sheet 4

INVENTOR
Albert George Hillman
BY
Nathan, Bowman & Helfrich
ATTORNEY

Patented July 18, 1933

1,919,021

UNITED STATES PATENT OFFICE

ALBERT GEORGE HILLMAN, OF LONDON, ENGLAND, ASSIGNOR TO COLOURGRAVURE LIMITED, OF LONDON, ENGLAND

CAMERA

Application filed May 29, 1931. Serial No. 540,852.

The present invention deals with improvements in and relating to photographic cameras.

The invention has particular reference to cameras for colour photography in which multiple images are taken by simultaneous exposure from the same point of view, and deals especially with a camera incorporating an optical system according to my co-pending application, Serial No. 541,001, filed May 29, 1931, comprising a pair of intersecting reflecting surfaces so arranged as to divide the main image forming beam transmitted by an objective into sections which go to form the multiple images.

With this and similar systems it is highly desirable that the setting of the reflecting surfaces in relation to the objective and the optical axis when once determined should not be accidentally or unintentionally disturbed, and the focussing of the images to their respective focal planes instead of being effected by the more common lens focussing method is realized by simultaneously moving the focal planes.

To ensure that the resultant images shall be accurately registrable, the firm mounting of the plate holders and the design of apparatus for effecting their movement is of first importance, and it is an aim of the present invention to provide a strong stable mounting of the movable plate holders such that they will not depart angularly from their true planes and to provide a readily responsive and lasting mechanism for actuating the holders which contains the minimum number of relatively movable components and loose connecting links whereby to reduce as far as it is practicable to do so slackness and backlash between the various parts and which is such as to tend to equalize the effects of wear of the driving elements of the mechanism on the movements of the respective plate holders.

To this end according to the present invention the simultaneous movement of the focal planes is effected by sliding plate holders which along opposite sides thereof are firmly guided and controlled for actuation by direct drive through a pinion common to a rack of each holder.

The rack and pinion mechanism may be arranged at the top and bottom of each plate holder and the plate holders may be of boxlike form firmly and light-tightly guided in the camera casing. Top and bottom pinions secured to a common vertical shaft will operate the multiple horizontally disposed racks on rotation of the shaft by means of a knob or handle thereon disposed exteriorly of the camera.

The invention further provides for compensating for chromatic dispersion caused by the lens.

In order that the invention may be the more readily understood reference is hereinafter to be had to the accompanying drawings in which:—

Figure 1:
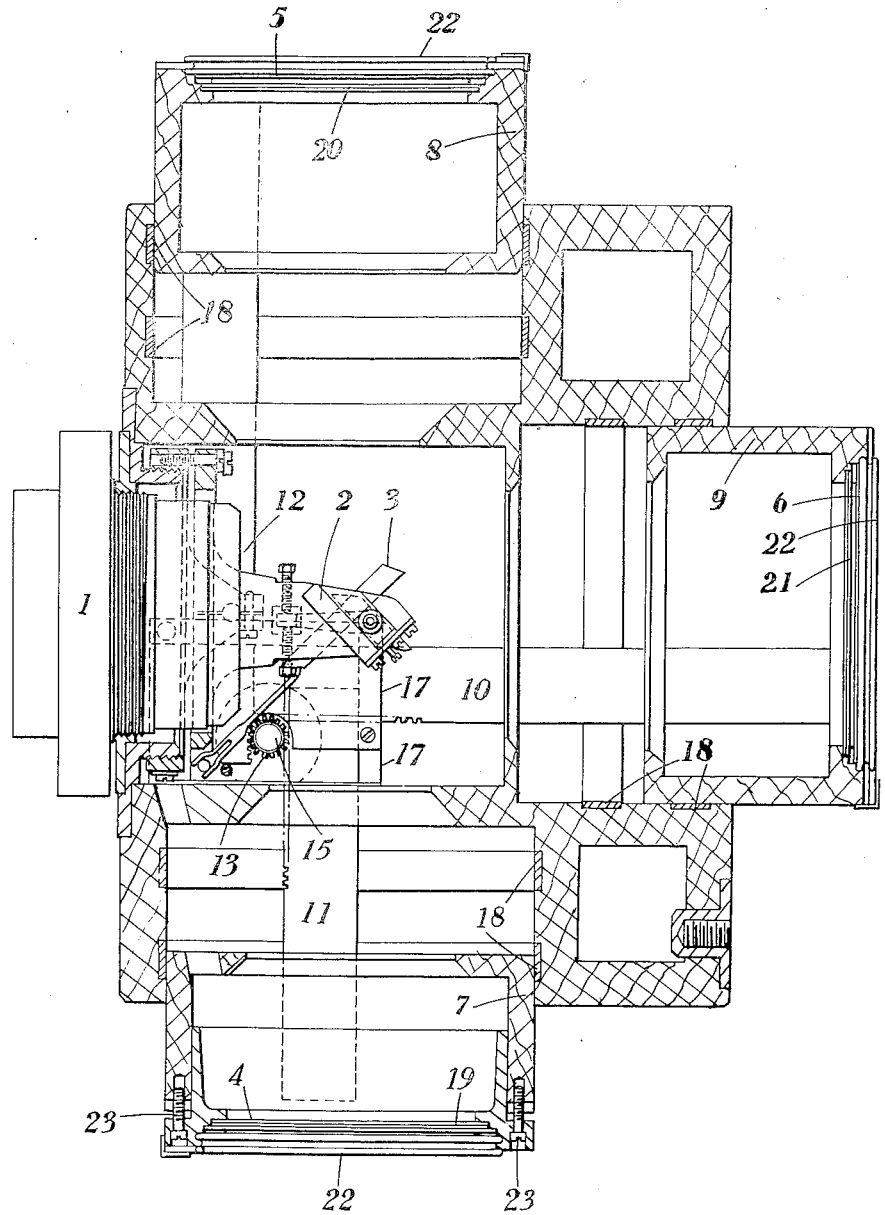
Fig. 1 is a sectional plan view, Fig. 2 a side section elevation, and Fig. 3 a front elevation of one form of camera according to this invention.
Figure 2:
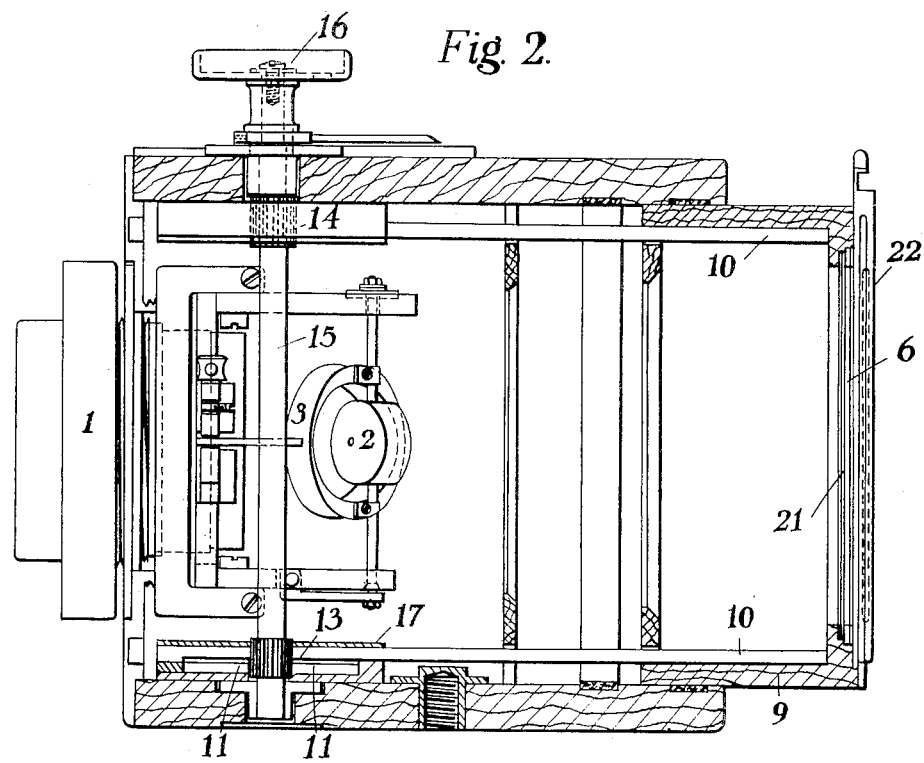
Figure 3:
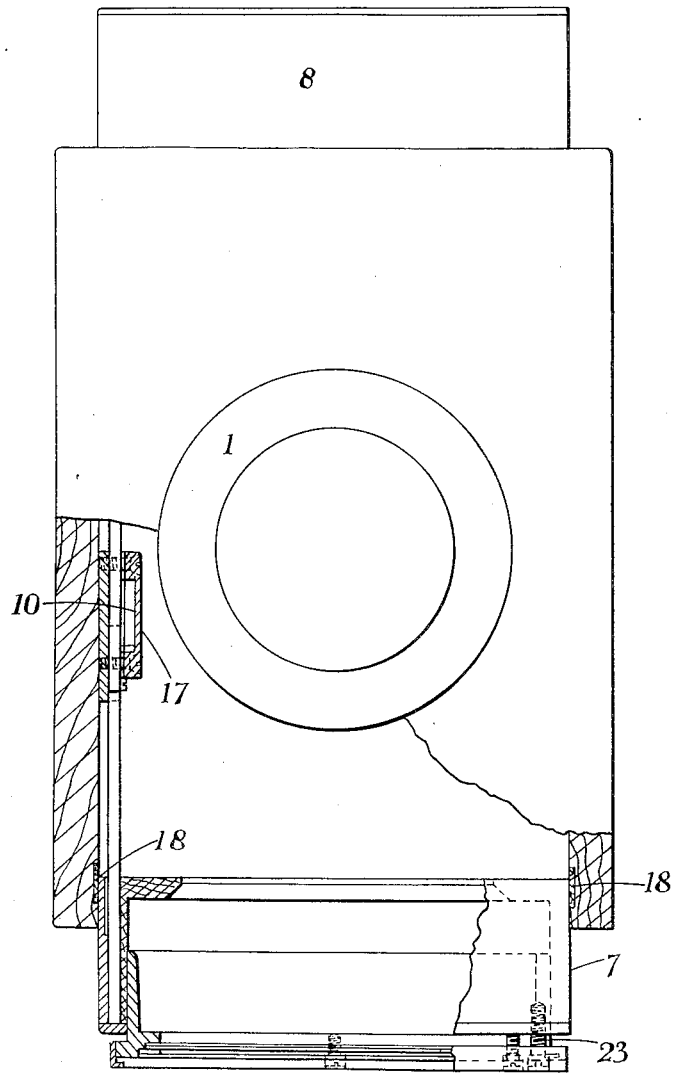

Referring to the drawings, 1 is the mount for the objective behind which is shown a light dividing system in the form of a pair of intersecting reflectors 2, 3 which are so shaped and positioned as to divide the main beam of light from the objective and produce even illumination of the plates 4, 5 and 6 at the respective focal planes. The plate 4 is illuminated by light reflected from the disc reflector 2, the plate 5 by light reflected from the ring-like reflector 3, and the plate 6 by direct light passing on the one hand by the outer contour of the ring reflector 3 and on the other hand through the annular space formed by the periphery of the disc reflector 2 and the inner contour of the ring reflector 3.

The light dividing system and the objective are mounted in correct relationship on a frame or panel and the unit thus formed is secured in the camera in position to illuminate each of the three plates.

In order not to disturb the setting of the optical combination of the light dividing system and the objective, focussing of the system according to the present invention is effected by simultaneously moving the plates 4, 5, 6.

For this purpose each of the focal plane change boxes and plate holders 7, 8, and 9 are provided with a pair of racks 10, 10, 11, 11, 12, 12 actuated simultaneously through pinions 13, 14 on a spindle 15 by a single knob or handle 16. The racks are firmly guided in shoes 17, so as to be retained in true engagement with the pinions, and to preserve the stability of the sliding plate holders.

The change-boxes slide into guides in the casing and maintain light-tight engagement therewith by means of the velvet linings 18.

The change-boxes hold colour filters 19, 20, and 21 which with the plates 4, 5 and 6 are retained by spring frames 22.

The focal planes may each be capable of independent adjustment such as by the set-screws 23.

Figure 4:
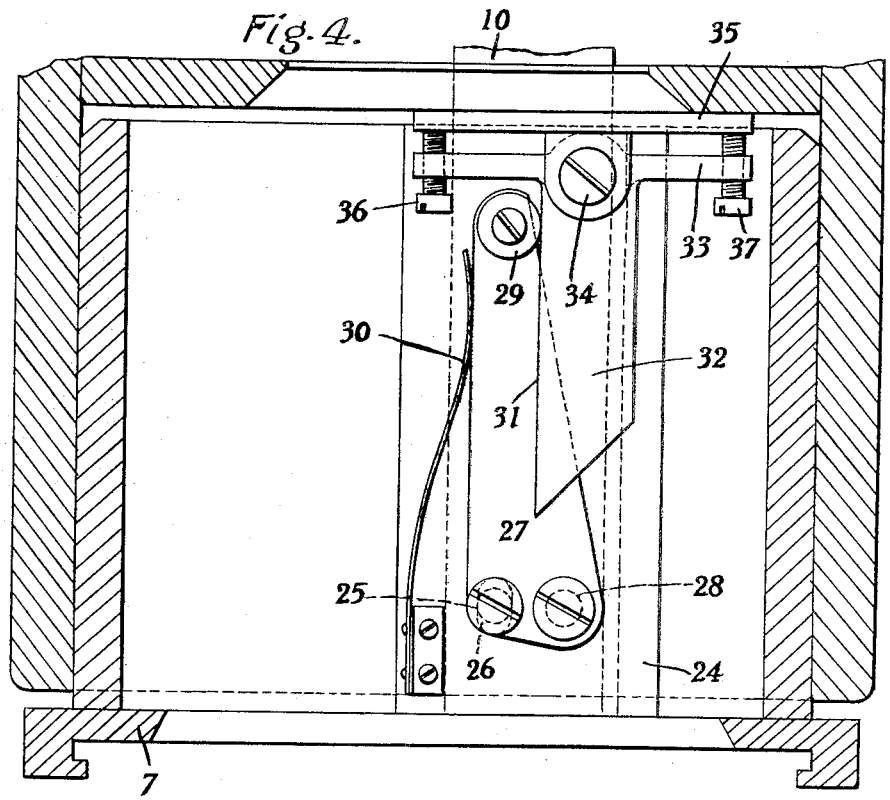
Fig. 4 is a sectional plan view through one of the focal plane change boxes showing a compensating mechanism hereinafter described.
Figure 5:
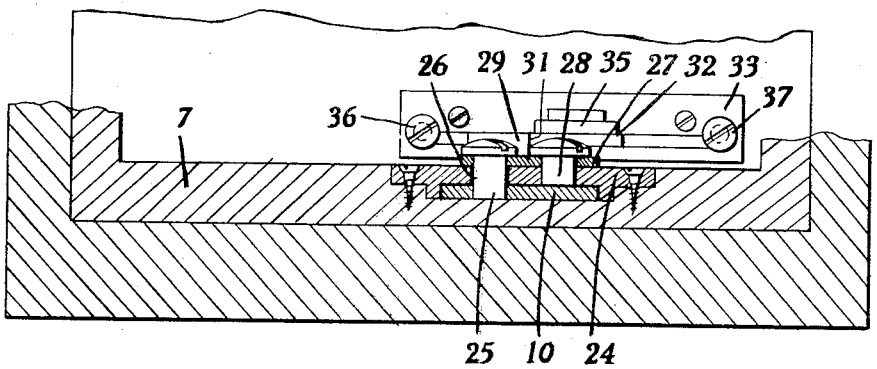
Fig. 5 is a sectional elevation thereof.

In order to compensate for chromatic dispersion of the beam transmitted by the objective, means, as for example, are illustrated in Figs. 4 and 5, may be provided to cause one or more of the focal planes to have an accelerated or retarded movement with respect to the other focal plane or planes.

For this purpose the pinion actuated rack 10, for example, may fit, with freedom to slide slightly, in a shoe 24 secured to the appropriate focal change box 7, and have a pin 25 which passes through a slot 26 in the shoe 24 and forms a pivot for a lever 27 which at 28 is pivoted to the shoe. The other end of the lever has a roller 29 which is held by a spring 30 against an edge 31 of an arm 32 projecting from a plate 33 pivoted at 34 on a bracket 35 secured to the casing. By rotating the plate from the neutral position shown in the drawing and appropriately setting the screws 36, 37 the angular position of the arm 32 may be varied and thereby the lever 27, which moves in a straight path with the rack when the arm 32 is in the neutral position, is caused in travelling forward to turn about the pivot 25 and accelerate or retard the motion of the box according to which side of the neutral position the edge 31 of the arm is inclined.

If desired the roller at the end of the lever may work in a constant width track or way in the arm projecting from the plate instead of being retained against the edge 31 by a spring.

What I claim is:—

1. A camera for taking multiple images by simultaneous exposure from the same point of view comprising a casing; an objective; a light dividing system disposed behind said objective for dividing a beam of light transmitted thereby into sections to form the multiple images; holders for the image-receiving elements firmly slide-guided in said casing; racks on opposite sides of said holders; a directly driven master spindle and pinions thereon; each of said pinions being common to a rack of each holder, whereby said holders may be moved simultaneously to focus the multiple images by rotation of said master spindle.

2. A camera for taking multiple images by simultaneous exposure from the same point of view comprising a casing; a light dividing system for dividing a beam of light into sections to form the multiple images; holders for the image-receiving elements slidably mounted in said casing; said holders along opposite sides thereof being firmly guided and controlled for simultaneous movement to focus the multiple images by direct drive through a pinion common to a rack of each holder; and means for imparting an accelerated or retarded movement to one or some of said holders to compensate for chromatic dispersion.

3. A camera for taking multiple images by simultaneous exposure from the same point of view comprising a casing, a light dividing system for dividing a beam of light into sections to form the multiple images, holders for the image-receiving elements slidably mounted in said casing, said holders along opposite sides thereof being firmly guided and controlled for simultaneous movement to focus the multiple images by direct drive through a pinion common to a rack of each holder, and a lost motion mechanism for effecting a relative retardation of one or some of said holders to compensate for chromatic dispersion.

4. A camera for taking multiple images by simultaneous exposure from the same point of view comprising a casing; a light dividing system for dividing a beam of light into sections to form the multiple images; box-like holders for the image-receiving elements firmly and light-tightly slide-guided in said casing; said holders on opposite sides thereof being controlled for simultaneous movement to focus the multiple images by direct drive through a pinion common to a rack of each holder, and means for imparting an accelerated or retarded movement to one or some of said holders to compensate for chromatic dispersion.

5. A camera for taking multiple images by simultaneous exposure from the same point of view comprising a casing; a light dividing system for dividing a beam of light into sections to form the multiple images; holders for the image-receiving elements slidably mounted in said casing; said holders along opposite sides thereof being firmly guided and controlled for simultaneous movement to focus the multiple images by direct drive through a pinion common to a rack of each holder; and means for imparting an accelerated or retarded movement to one or some of said holders to compensate for chromatic dispersion, said means comprising a lever pivotally mounted on a holder; a lost motion connection between said lever and a rack; and means whereby said lever is caused gradually to turn during the movement of the rack so as to effect a relative movement between the rack and the holder; said last mentioned means being adjustable to regulate the extent of such relative movement.

6. A camera for taking multiple images by simultaneous exposure from the same point of view comprising a casing, a light dividing system for dividing a beam of light into sections to form the multiple images, holders for the image-receiving elements slidably mounted in said casing, said holders being firmly guided along opposite sides thereof; a rack for each holder; a common pinion meshing with said racks; and means to rotate said pinion so as simultaneously to move said holders to focus the multiple images.

7. A camera for taking multiple images by simultaneous exposure from the same point of view comprising a casing; a light dividing system for dividing a beam of light into sections to form the multiple images; box-like holders for the image-receiving elements firmly and light-tightly slide-guided in said casing; racks on opposite sides of said holders; a master spindle and pinions thereon; each of said pinions being common to a rack of each holder; said spindle being rotatable whereby to move said holders simultaneously to focus the multiple images.

8. A camera for taking multiple images by simultaneous exposure from the same point of view comprising a casing; an objective; a light dividing system for dividing a beam of light into sections to form the multiple images; holders for the image-receiving elements firmly slide-guided in said casing; racks on opposite sides of said holders; a master spindle and pinions thereon; each of said pinions being common to a rack of each holder, whereby said holders may be moved simultaneously to focus the multiple images by rotation of said master spindle.

ALBERT GEORGE HILLMAN.